(12) United States Patent
Halwax et al.

(10) Patent No.: US 11,479,154 B2
(45) Date of Patent: Oct. 25, 2022

(54) VEHICLE SEAT COMPRISING A TEMPERATURE-CONTROL SYSTEM

(71) Applicant: Bayerische Motoren Werke Aktiengesellschaft, Munich (DE)

(72) Inventors: Bernhard Halwax, Eching (DE); Christian Rosskopf, Donauwoerth (DE); Peter Satzger, Landsberg am Lech (DE); Stefan Wiedemann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/297,272

(22) PCT Filed: Jan. 21, 2020

(86) PCT No.: PCT/EP2020/051319
§ 371 (c)(1),
(2) Date: May 26, 2021

(87) PCT Pub. No.: WO2020/156866
PCT Pub. Date: Aug. 6, 2020

(65) Prior Publication Data
US 2022/0024361 A1    Jan. 27, 2022

(30) Foreign Application Priority Data

Jan. 28, 2019   (DE) ...................... 10 2019 102 058.1

(51) Int. Cl.
*B60N 2/56*    (2006.01)
*B60N 2/90*    (2018.01)

(52) U.S. Cl.
CPC ......... *B60N 2/5657* (2013.01); *B60N 2/5685* (2013.01); *B60N 2/5692* (2013.01); *B60N 2/976* (2018.02)

(58) Field of Classification Search
CPC ........................... B60N 2/5657; B60N 2/5685
See application file for complete search history.

(56) References Cited

U.S. PATENT DOCUMENTS 6,254,179 B1    7/2001  Kortuem et al.
10,603,976 B2*  3/2020  Androulakis ............ B60N 2/56
(Continued)

FOREIGN PATENT DOCUMENTS

CN         106828223 A      6/2017
DE   10 2004 007 859 A1    9/2005
(Continued)

OTHER PUBLICATIONS

International Search Report (PCT/ISA/210) issued in PCT Application No. PCT/EP2020/051319 dated Apr. 3, 2020 with English translation (four (4) pages).
(Continued)

*Primary Examiner* — Shin H Kim
(74) *Attorney, Agent, or Firm* — Crowell & Moring LLP

(57) ABSTRACT

A vehicle seat is provided with a temperature-control system which is connectable or connected to a temperature-control circuit that conveys a temperature-control medium. Thermal energy from the temperature-control medium conveyed in or to at least one temperature-control heat exchanger of the temperature-control system is deliverable to and/or absorbable from the surroundings. The vehicle seat has at least one flow generation system, in particular a fan system, which generates a gas flow. The at least one flow generation system is controllable by a controller, with the temperature of the gas flow being controllable via at least one temperature-control heat exchanger and/or via an electrically operated temperature-control element.

17 Claims, 3 Drawing Sheets

(56) References Cited

U.S. PATENT DOCUMENTS

| | | | |
|---|---|---|---|
| 11,358,433 B2* | 6/2022 | Androulakis | B60N 2/5621 |
| 2005/0184565 A1 | 8/2005 | Weiss et al. | |
| 2009/0250980 A1 | 10/2009 | Major et al. | |
| 2017/0096044 A1 | 4/2017 | Kim et al. | |
| 2017/0361676 A1* | 12/2017 | Androulakis | B60H 1/3204 |
| 2020/0215870 A1* | 7/2020 | Androulakis | B60N 2/5621 |
| 2022/0024361 A1* | 1/2022 | Halwax | B60N 2/5657 |

FOREIGN PATENT DOCUMENTS

| | | |
|---|---|---|
| DE | 10 2005 007 478 A1 | 9/2005 |
| DE | 10 2009 015 966 A1 | 10/2009 |
| DE | 11 2016 001 567 T5 | 12/2017 |
| WO | WO 99/24275 | 5/1999 |
| WO | WO 2010/008158 A1 | 1/2010 |
| WO | WO 2017/201083 A2 | 11/2017 |
| WO | WO 2018/049159 A1 | 3/2018 |

OTHER PUBLICATIONS

German-language Written Opinion (PCT/ISA/237) issued in PCT Application No. PCT/EP2020/051319 dated Apr. 3, 2020 (six (6) pages).

German-language Office Action issued in German Application No. 10 2019 102 058.1 dated Oct. 17, 2019 (five (5) pages).

\* cited by examiner

VEHICLE SEAT COMPRISING A TEMPERATURE-CONTROL SYSTEM

BACKGROUND AND SUMMARY OF THE INVENTION

The invention relates to a vehicle seat having a temperature-control device, wherein the temperature-control device is connectable or connected to a temperature-control circuit which transports a, particularly liquid, temperature-control medium and, by means of at least one temperature-control heat exchanger of the temperature-control device, thermal energy can be released to and/or absorbed from the surroundings by the temperature-control medium transported in or at the temperature-control heat exchanger.

Corresponding vehicle seats with a temperature-control device for warming or cooling a vehicle seat are basically known from the prior art. For example, the teaching of WO 99/24275 concerns, in one embodiment, a vehicle seat which is at least connected to a combined heating/cooling element which, for the climate control of the vehicle seat, is selectively connectable to the secondary circuit of a heat exchanger which, on the primary side, is subjected to the action of at least one on-board heat generator, and/or to the secondary circuit of a heat exchanger which, on the primary side, is subjected to the action of at least one on-board cold generator. The transport of the thermal energy is performed here at least in part by means of water which is free from aggressive or poisonous additives.

The invention is based on the object of specifying a vehicle seat having a temperature-control device which, in particular with regard to a simple and fast and inexpensive measure, improves the temperature control of the surroundings around the vehicle seat and/or the temperature control of the vehicle seat itself.

The object is achieved by means of a vehicle seat having a temperature-control device wherein the temperature-control device is connectable or connected to a temperature-control circuit which transports a, particularly liquid, temperature-control medium and, by means of at least one temperature-control heat exchanger of the temperature-control device, thermal energy can be released to and/or absorbed from the surroundings by the temperature-control medium transported in or at the temperature-control heat exchanger. The vehicle seat is distinguished by the fact that the vehicle seat has at least one flow-generating device, in particular blower device, which generates a gas stream and which is in particular controllable by means of a control device, wherein temperature control of the gas stream can be performed by means of at least one temperature-control heat exchanger and/or by means of an electrically operated temperature-control element. Here, temperature control means a transfer of thermal energy from a first to a second body and/or fluid. The temperature-control device of the vehicle seat serves for temperature control of the vehicle seat and thus also for temperature control of the surroundings of the vehicle seat. It is thus possible for temperature control of at least one area of contact of the vehicle seat with a person sitting on the vehicle seat, and/or of the air space surrounding the vehicle seat, to be performed. The temperature-control medium has at least water. For example, pure water or water mixed with glycol may be used as temperature-control medium. Optionally or in addition, a liquid medium, for example oil or an oil-additive mixture, may be used as temperature-control medium. The temperature-control device in the vehicle seat may preferably be connectable or connected to a temperature-control circuit in the vehicle.

Temperature control of the temperature-control medium transported in the temperature-control circuit in the vehicle is performed by means of temperature-control means or a source temperature-control device in the vehicle, for example a refrigeration and/or cooling circuit in the vehicle, which may in particular be thermally operatively connected to an air-conditioning unit and/or to an internal combustion engine of the vehicle. In other words, an exchange of thermal energy takes place between the refrigeration and/or cooling circuit in the vehicle and the temperature-control medium transported in the temperature-control circuit and also in the temperature-control heat exchanger in the vehicle seat. Through the use of a liquid temperature-control medium, transport of thermal energy within the vehicle to the vehicle seat can be performed in an effective and efficient manner. Also, the liquid temperature-control medium allows effective and efficient generation of thermal energy and temperature control of the vehicle seat and/or of the surroundings thereof. In order to allow an effective release of heat and/or absorption of heat by the at least one temperature-control heat exchanger, this may be of areal form and/or may areally release thermal energy to, and/or absorb thermal energy from, the vehicle seat and/or the surroundings. The vehicle seat is equipped with a flow-generating device, for example with a blower or fan device, by means of which a gas stream, in particular an air stream, can be generated or is at least temporarily generated. The power of the flow-generating device, that is to say for example a volume flow and/or a flow speed of the gas stream, may preferably be variable or controllable by means of a control device arranged in the vehicle seat and/or in the vehicle that accommodates the vehicle seat. Alternatively or in addition, the control device may be formed at least temporarily by a mobile terminal or receiver unit, for example by a smartphone or a tablet computer. The mobile terminal may be in the form of a portable electronic terminal or in the form of an electronic mobile unit. For example, a smartphone, a tablet computer and/or a portable computer (for example laptop) may be used as an electronic terminal. It is also optionally or additionally possible, by way of approach detection, to detect the situation in which a person is approaching the vehicle equipped with the vehicle seat, and this information leads to an activation and/or change of the operating state of the temperature-control device. For example, approach detection may be implemented by taking into consideration the position of a vehicle key.

It is possible for at least one temperature-control heat exchanger to be arranged or formed in or on a seat surface and/or in or on a backrest of the vehicle seat. For example, a first temperature-control heat exchanger is arranged or formed in or on a seat surface and a second temperature-control heat exchanger is arranged or formed in or on a backrest of a vehicle seat. It is also possible for a group of temperature-control heat exchangers to be arranged or formed in or on the seat surface and/or in or on the backrest. The temperature-control heat exchangers arranged or formed within or on a vehicle seat may be arranged or formed in series, that is to say the temperature-control medium flowing through these or past these (in thermal operative connection) controls the temperature of the at least two temperature-control heat exchangers, or flows through the at least two temperature-control heat exchangers with temperature-controlling action, in succession. The seat surface is to be understood to mean that assembly or region of a vehicle seat which forms a seat region of the vehicle seat, and may in particular also comprise the components seat cushion, seat lining, seat support structure and/or the like.

The flow-generating device may for example comprise at least two fans or blowers, which are preferably controllable in closed-loop fashion separately from one another by means of the control device. For example, a first gas stream is transported by a first blower and a second gas stream is transported by a second blower, wherein, preferably, a first gas stream is diverted such that a person sitting on the vehicle seat is impinged on and a second gas stream is diverted such that a person sitting on the vehicle seat is not impinged on, that is to say, for example, the second gas stream is diverted or directed into a direction pointing away from the seating position of the person sitting on the vehicle seat. In particular, the second gas stream may be diverted or directed to a further vehicle occupant who is situated, in particular seated, adjacent to and/or behind and/or in front of the vehicle seat equipped with the flow-generating device.

The vehicle seat may comprise at least one control means which is controllable by means of a control device and by means of which (a) a sequence of the transport of the temperature-control medium through or at at least two temperature-control heat exchangers arranged within a vehicle seat, and/or (b) a quantity and/or a volume flow of the temperature-control medium transported through or at at least one temperature-control heat exchanger, is variable. Here, the control device may be configured analogously to the control device that controls the flow-generating device. The control means may be arranged upstream, downstream or at branching points of the connecting lines and/or temperature-control heat exchangers that transport the temperature-control medium. In general, control means may be arranged both in or on the vehicle seat and in or on the vehicle that accommodates the vehicle seat. For example, a control means is in the form of a valve, in particular in the form of a 2/3 directional valve. A control means may also be in the form of a rotary slide.

The vehicle seat may for example comprise at least one flow means which is preferably controllable by means of a control device and which is configured to at least temporarily vary flow characteristics of the temperature-control medium at least in certain sections. For example, a flow resistance and/or a flow type and/or a volume flow and/or a flow speed within the temperature-control medium transported in the vehicle seat can be varied at least in certain sections by the control means. For example, a flow cross section within a connecting line and/or within a temperature-control heat exchanger can be changed by a flow means, and thus a flow resistance and/or a flow type (for example linear or turbulent flow) can be influenced, which can be associated with a variation of the thermal energy transfer properties of the temperature-control medium and/or of the temperature-control medium flowing through the temperature-control heat exchanger.

It is possible for at least one temperature-control heat exchanger and/or at least one connecting line which is arranged or formed in or on the vehicle seat and which transports the temperature-control medium to be of variable-length, in particular elastic form at least in certain sections. During a variation in length of the connecting line and/or of the temperature-control heat exchanger, leak-tightness of the circuit transporting the temperature-control medium is ensured, and it is thus achieved that, despite a variation or a movement of individual components of the vehicle seat, the controllability of the temperature of the vehicle seat and/or of the surroundings thereof remains ensured. For example, a vehicle seat has a thigh support which is mounted so as to be movable relative to a central seat surface section, wherein in each case at least one temperature-control heat exchanger is arranged or formed in the central seat surface section and in the thigh support. The at least two temperature-control heat exchangers are connected to one another by a connecting line. By virtue of the fact that the connecting line is of variable-length form, that is to say for example of elastic form at least in certain sections, a relative movement of the thigh support and of the central seat surface region is made possible, wherein transport of the temperature-control medium between the two temperature-control heat exchangers is made possible despite a variation of the relative position and/or orientation thereof.

In a further advantageous embodiment, the vehicle seat comprises at least one massage device, which is in particular controllable by means of a control device and which is configured to, at least in certain sections, generate mechanical impulses and/or transmit these to a person sitting on the vehicle seat, and preferably, the massage device is in the form of a massage means through and/or around which the temperature-control medium flows. The massage device may comprise electrically operable actuators which generate the mechanical impulses. Alternatively or in addition, the mechanical impulses may be generated and/or transmitted by pressure pulses, which act at least in certain sections, within the temperature-control medium. For example, the massage function of the massage means is attained by alternating action of pressure of the temperature-control medium. For this purpose, within the elements that conduct or transport the temperature-control medium, a pressure pulsation of the temperature-control medium can be transmitted or imparted to adjacent components or regions. For example, by alternating pressure of the temperature-control medium or by pressure pulsations of the temperature-control medium, a mechanical force or a mechanical impulse can be generated and/or transmitted to a person sitting on the vehicle seat. Preferably, the generation and/or the transmission of mechanical impulses to individual regions of the vehicle seat are controllable and/or variable selectively, in particular by means of a control device, such that the location and/or the intensity of a vibration perceptible to a person sitting on the vehicle seat, or of the mechanical impulse, is controllable and/or variable.

It may prove to be advantageous if the vehicle seat comprises at least one electrically operated or operable radiation heating means which is configured to radiate thermal radiation. The temperature control of the vehicle seat and/or the temperature control of the surroundings of the vehicle seat by means of at least one temperature-control heat exchanger used in particular by way of a liquid temperature-control medium can be supplemented by a radiation heating means. The radiation heating means can relatively swiftly provide heat that is perceptible to a person. The radiation heating means is preferably arranged or formed in a backrest and/or in a transition region of backrest and seat surface of the vehicle seat such that the thermal radiation radiated by it is directed in a direction pointing away from a seating position on the vehicle seat. Thus, in the case of a vehicle equipped with at least two vehicle seats arranged one behind the other, it may be provided that the two vehicle seats are at least temporarily oriented in the same direction. In other words, the two vehicle seats are at least temporarily oriented such that the viewing directions of persons each assuming a typical seating position are identical. In this case, by way of a radiation heating means arranged at the rear side (direction opposite to the viewing direction of a person sitting on said seat) of the backrest of a first vehicle seat, the thermal radiation emitted by said radiation heating means can be directed into a knee and/or foot region of a person sitting on the second vehicle seat, such that at least subjective heat is quickly perceptible to said person as a result of the thermal radiation. Alternatively or in addition, it is also possible for thermal radiation to be applied or applicable to laterally positioned seat regions, that is to say seat regions positioned to the left and/or to the right of a vehicle seat by the radiation heating means.

The vehicle seat may optionally comprise at least one valve means, which is in particular controllable by means of a control device and by means of which the temperature-control circuit is at least temporarily openable with respect to the surroundings, in particular with respect to a region situated outside a passenger compartment, which accommodates the vehicle seat, of a vehicle, and/or closable. The valve means allows a channel or a line which is in particular in the vehicle seat and which transports the temperature-control medium to be ventilated at least in certain sections. This facilitates in particular the installation and/or the exchange of a vehicle seat in a vehicle, because the ventilation of the vehicle seat can be performed on said vehicle seat itself, and no superordinate, possibly centralized, valve device has to be used. The valve means is preferably arranged or formed in or on the vehicle seat above the seat surface. For example, the valve means is arranged or formed in a backrest and/or in a head or neck support of the vehicle seat. Optionally, the valve means may have an automatic opening and closing mechanism, and in this way, the valve means can automatically open or close, for example in a manner dependent on the pressure and/or the air/gas fraction of the temperature-control medium. It may prove to be expedient if an air filter is arranged between the valve means and the surroundings. By virtue of the fact that the air filter acts at least for gases or air that enter into the valve means or into the temperature-control medium circuit, the ingress of contaminants, dust or other particles into the temperature-control medium circuit is prevented.

It is possible that the vehicle seat comprises at least one flow channel in which the gas stream generated by the flow-generating device can be transported at least in certain sections. Here, by means of the flow-generating device within the flow channel the gas stream can at least in certain sections be transported through at least one section of the flow channel by means of negative pressure and/or by means of positive pressure. Preferably, the gas stream is transportable from an induction opening, in particular on the vehicle seat, via the flow channel to an outlet opening, in particular on the vehicle seat. In one advantageous embodiment, the induction opening and outlet opening of the flow channel are arranged or formed on the vehicle seat. It may prove to be advantageous if the induction opening is arranged or formed at a front region (that is to say in the region of the typically arranged knee of a person sitting on the seat) situated below the seat surface, wherein, in particular, an induction of air situated below a vehicle seat is possible. In order to achieve targeted induction of as far as possible predominantly or exclusively air situated under the vehicle seat, it may be expedient for an air-guiding element to be arranged or formed on the vehicle and/or on the vehicle seat such that an induction of air from the foot region of the vehicle seat equipped with the flow-generating device, which generates and/or transports the gas stream, is prevented or limited in a targeted manner. In this case, exclusively or almost entirely or predominantly the air situated under the vehicle seat is inducted, without air from the foot region of a person sitting on said vehicle seat being used for this purpose. Consequently, an air stream directed rearwardly (in the direction of travel) in the foot region of a person sitting on a vehicle seat is prevented or lessened.

Alternatively or in addition, the vehicle seat may for example have two flow channels for at least temporarily transporting the gas stream. The volume flow and/or mass flow of gas or air transported in at least one flow channel, preferably in all flow channels, may, in particular by means of a control device, be varied or controlled with regard to the respective volume or mass flow transported in the individual flow channels by an acting control means. For example, an in particular automated, volume-flow-dependent distribution of the volume flow between the at least two flow channels is possible.

Furthermore, it may for example be expedient for an induction region for the induction of the gas stream upstream of the blower device to be arranged or formed below a seat surface of the vehicle seat and/or in a connecting region of a seat surface and of a backrest of the vehicle seat. It is thus made possible for in particular cold air situated below the seat surface to be inducted and subjected to temperature control. For this purpose, the induction region may be arranged or formed below the bottom side of a body, which forms a seat surface, of the vehicle seat.

The gas stream that flows through the flow channel may for example be transportable at least in certain sections in a direction which is not the same as the movement direction of the temperature-control medium transported through or at a temperature-control heat exchanger, and preferably, the gas stream is transported within the flow channel in a direction which is rotationally offset at least by 45°, preferably at least by 75°, particularly preferably by at least 90°, in particular in an opposite direction, in relation to the movement direction of the temperature-control medium transported in or at the temperature-control heat exchanger. In other words, by means of an opposing or crisscrossing flow direction of gas stream and temperature-control medium within the vehicle seat, an effective transfer or an effective exchange of thermal energy between the temperature-control medium and the gas stream can be achieved. In particular, a heat transfer between the temperature-control medium and gas stream can be achieved by means of the flow directions thereof in a counterdirectional flow principle. Alternatively, the flow directions of temperature-control medium and gas stream may be oriented in a codirectional flow principle.

It may also be provided that the vehicle seat comprises at least one, in particular movably mounted, air-guiding means, which directs a gas stream transported downstream of the flow-generating device into a direction pointing away from a seating position on the vehicle seat. Preferably, the at least one air-guiding means can be varied in terms of its orientation and/or positioning by means of an actuator which is operatively connected to a control device. Alternatively or in addition, an orientation and/or positioning of at least one air-guiding means can be varied by means of a manually operated operator control device, in particular via a mechanism.

The vehicle seat optionally comprises at least one electrically operated or operable temperature-control element, wherein the temperature-control element is in the form of a heating element and/or cooling element, and preferably, temperature-control element is in the form of a Peltier element. The electrically operated or operable temperature-control element can, as a heating and/or cooling means, control the temperature of the vehicle seat at least temporarily and at least in certain sections. Alternatively or in addition, the temperature-control element may be used for temperature control of the gas stream at least temporarily and at least in certain sections. In the case of at least one Peltier element, it is advantageous if the Peltier element is thermally operatively connected to at least one temperature-control heat exchanger at least in sections. For example, cooling of the seat surface of a vehicle seat is possible by means of the Peltier element. A Peltier element can, to a degree equal or similar to its cooling action, generate warming at a further location of the Peltier element. In this case, possibly undesired warming could occur at the further location of the Peltier element. Such undesired warming which can be associated with the cooling action of the Peltier element can be compensated by virtue of the fact that the Peltier element is thermally operatively connected to at least one temperature-control heat exchanger, such that any undesired generation of heat at the Peltier element can be transported away by the temperature-control medium conducted through the temperature-control heat exchanger. In this way, improved and fast temperature control can be achieved in a desired manner at a vehicle seat. It is also possible, for example, for at least one Peltier element to be arranged or formed with a temperature-control heat exchanger within the vehicle seat such that at least one active temperature-control surface of the Peltier element is in, in particular direct, contact with at least one temperature-control heat exchanger.

It is possible for the vehicle seat to comprise at least one electrically operated or electrically operable temperature-control element, in particular a Peltier element, wherein a heating and/or cooling power of the at least one temperature-control element is variable, at least temporarily in a manner dependent on a heating and/or cooling power of at least one temperature-control heat exchanger of the vehicle seat, in particular by means of the control device. The heating and/or cooling power of the temperature-control element and/or of the temperature-control heat exchanger may be controlled for example by means of a temperature sensor arranged in particular in the vehicle seat. The measured values of the temperature sensor may serve as open-loop and/or closed-loop control variables for the open-loop and/or closed-loop control of the heating and/or cooling power of the temperature-control element and/or of the temperature-control heat exchanger. Alternatively or in addition to the ascertainment of the heating and/or cooling power by means of a temperature sensor, a heating and/or cooling power of at least one temperature-control heat exchanger and/or of at least one temperature-control element may be extracted or derived from respective operating information items of the temperature-control element and/or of the temperature-control heat exchanger, from a characteristic map stored in a memory device and/or from vehicle operation information items.

Aside from the vehicle seat, the invention also relates to a vehicle equipped with at least one vehicle seat described herein, and/or to a method for the temperature control of a vehicle seat using at least one vehicle seat described herein.

All advantages, details, embodiments and/or features of the vehicle seat according to the invention are transferable or applicable to the vehicle according to the invention and/or to the method according to the invention.

The invention will be discussed in more detail on the basis of exemplary embodiments in the drawings.

DETAILED DESCRIPTION OF THE DRAWINGS

Figure 1:
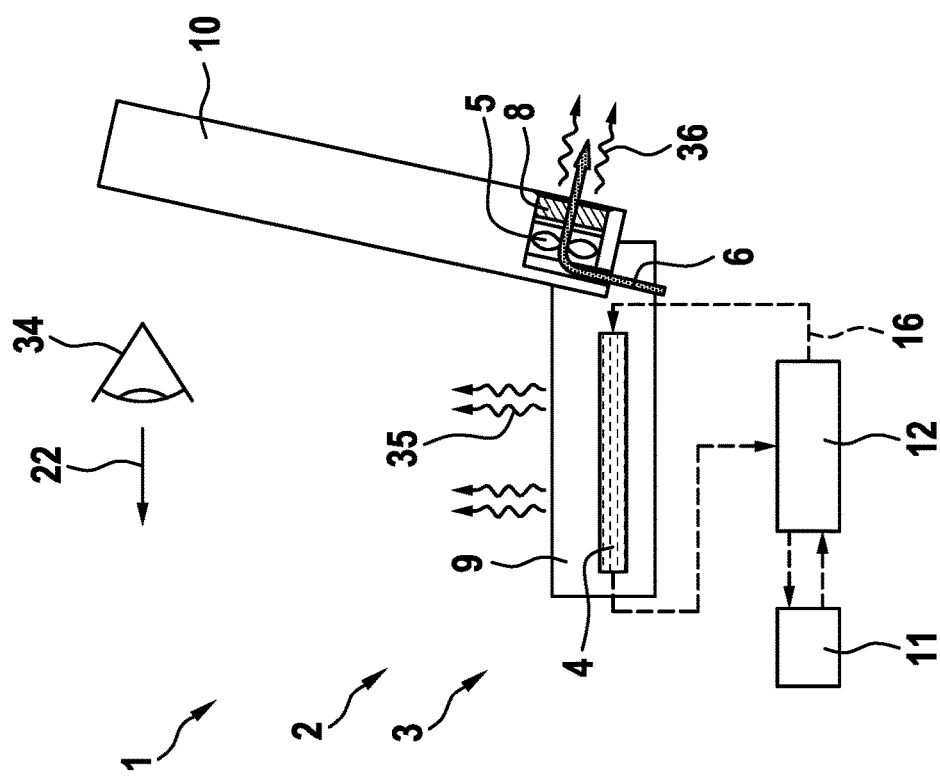
FIG. 1 is a diagrammatic illustration of a vehicle seat according to an embodiment of the present invention.

The figures show a vehicle seat 1 having a temperature-control device 2, wherein the temperature-control device 2 is connectable or connected to a temperature-control circuit 3 which transports an in particular liquid temperature-control medium (not illustrated) and, by means of at least one temperature-control heat exchanger 4, 4', 4", 4''' of the temperature-control device 2, thermal energy can be released to and/or absorbed from the vehicle seat 1 and/or the surroundings by the temperature-control medium transported in or at the temperature-control heat exchanger 4, 4', 4", and thus thermal energy or heat can be transmitted (selectively in both directions) to or from a person sitting on the vehicle seat 1. The vehicle seat 1 has a flow-generating device 5 by means of which at least one gas stream 6 can be generated. The flow-generating device 5, which may in particular be in the form of a blower device, can be controlled in terms of its power, and/or in terms of the flow direction of the gas stream 6 caused by it, by means of a control device 7, cf. FIGS. 1 and 4. The gas stream 6 is temperature-controlled by means of a temperature-control heat exchanger 4, 4" (cf. FIGS. 3 and 2) or by means of an electrically operated temperature-control element 8 (cf. FIG. 1), such that a warmed or cooled gas stream 6 flows out of the vehicle seat 1. Here, it is preferably provided that the temperature-controlled gas stream 6 flowing out of the vehicle seat 1 is oriented toward a region situated adjacent to or behind the vehicle seat 1. In other words, by means of the temperature-controlled gas stream 6 generated at a first vehicle seat 1, a region adjacent to the vehicle seat 1, in particular seat region of a second vehicle seat 1', is temperature-controlled, cf. FIG. 3.

At least one temperature-control heat exchanger 4, 4', 4" is arranged or formed in or on a seat surface 9 and/or in or on a backrest 10 of the vehicle seat 1. Here, seat surface 9 refers to that assembly or region of a vehicle seat 1 which forms the seat region of the vehicle seat 1, and may in particular also comprise the elements seat cushion, seat lining, seat support structure and/or the like. A first temperature-control heat exchanger 4 and/or at least one first group of temperature-control heat exchangers 4 is arranged in the seat surface 9. A second temperature-control heat exchanger 4' and/or at least one second group of second temperature-control heat exchangers 4' is arranged in the backrest 10, cf. FIG. 2. Optionally, a third temperature-control heat exchanger 4" may be arranged in the seat surface 9 and/or in the backrest 10, but it is essential that said third temperature-control heat exchanger 4" exclusively and/or predominantly or primarily performs temperature control of the gas stream 6, whereas the first and second temperature-control heat exchangers 4, 4' exclusively and/or predominantly or primarily temperature control of the vehicle seat 1 and thus a provision of thermal energy to a person sitting on the vehicle seat, in particular by contact with heat-conducting elements of the vehicle seat 1. Thermal energy, that is to say heat, can thus be exchanged (in both directions) from the temperature-control medium via the temperature-control heat exchanger 4, 4', 4''' to a person 9 sitting on the vehicle seat 1. In a further optional embodiment, in the region of the seat surface 9, the latter may be of at least two-part construction, wherein at least two temperature-control heat exchangers 4, 4''' are located in different sections 17, 18 of the seat surface 9. The temperature-control heat exchangers 4, 4', 4'', 4''' may for example be of areal form, such that they can exchange thermal energy with the surroundings or with a contact partner over an areal region.

Figure 2:
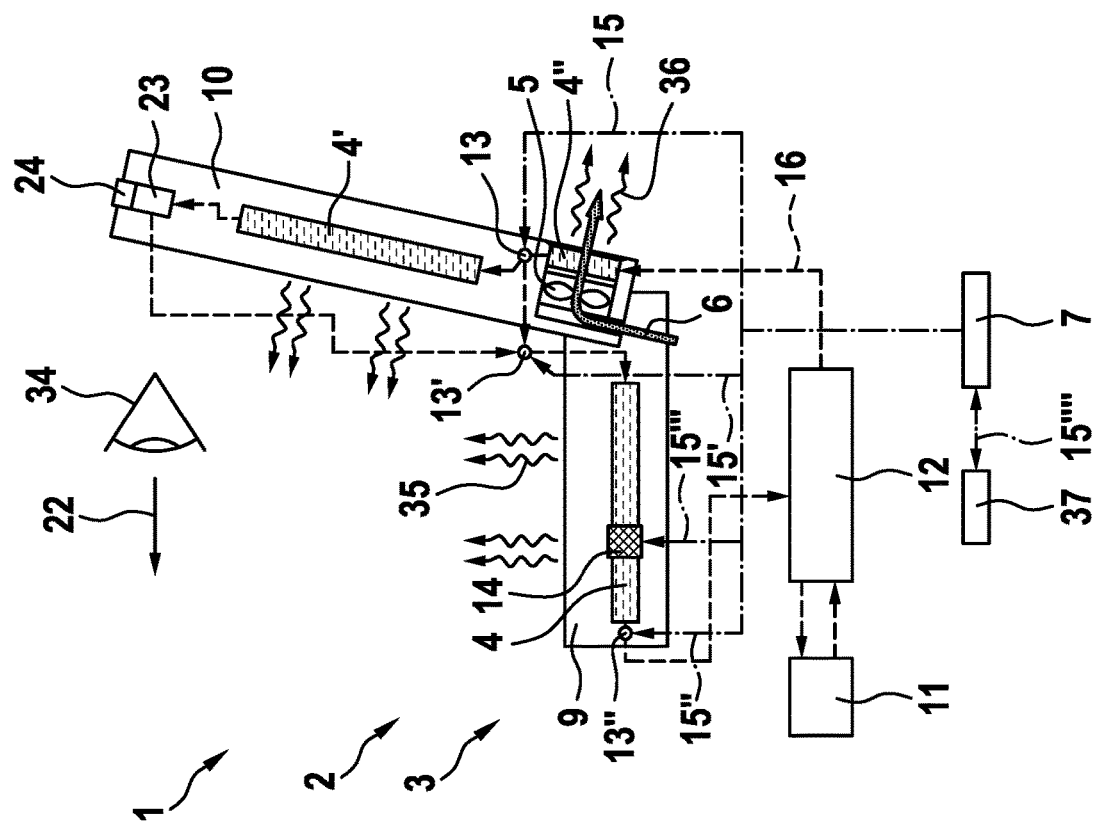
FIG. 2 is a diagrammatic illustration of a vehicle seat according to an embodiment of the present invention.
Figure 4:
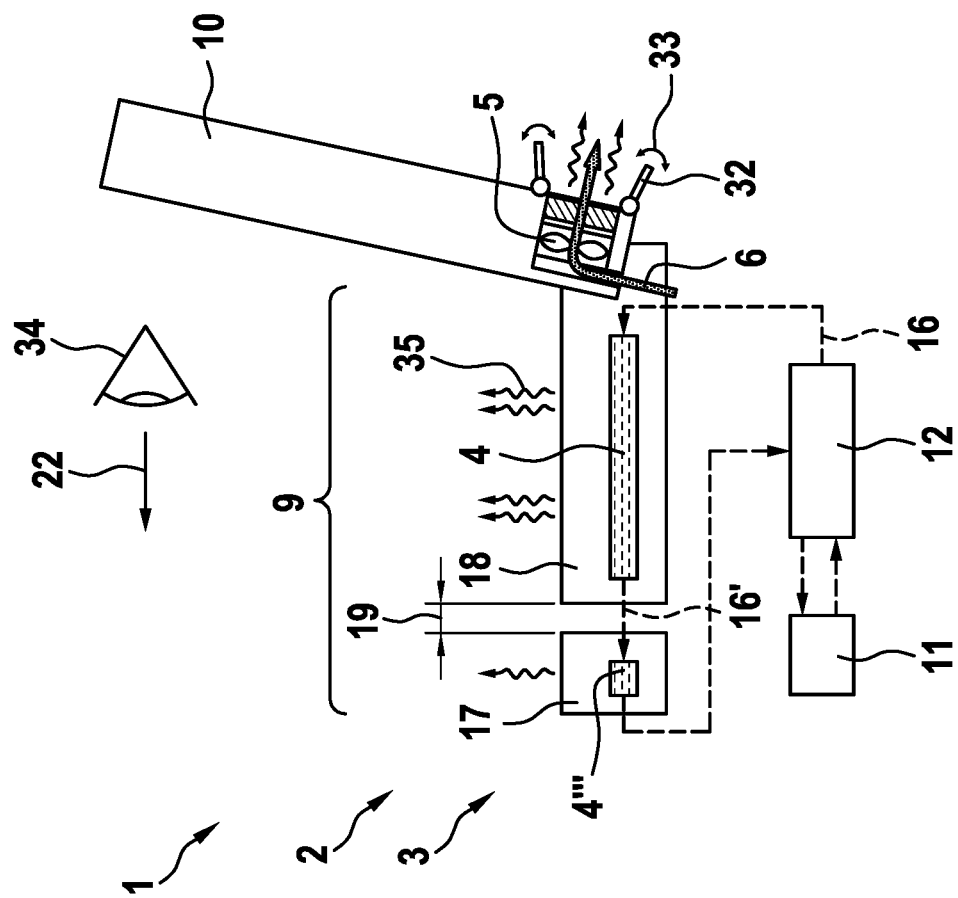
FIG. 4 is a diagrammatic illustration of a vehicle seat according to an embodiment of the present invention.

In the embodiment illustrated in FIG. 2, three temperature-control heat exchangers 4, 4', 4'' are flowed through in succession, that is to say in series, by the temperature-control medium. The temperature-control heat exchangers 4, 4', 4'' are temperature-controlled proceeding from a source temperature-control device 11 or temperature-control means in the vehicle, which may for example be operatively connected to a heating and/or cooling circuit (not illustrated) in the vehicle. Thus, the source temperature-control device 11 or a heating and/or cooling circuit in the vehicle, may be formed so as to be operatively connected to an internal combustion engine which propels the vehicle. Alternatively or in addition, the source temperature-control device 11 may be designed as a heating and/or cooling appliance which is used for the temperature control of the vehicle without any propulsion function. The transfer of the source temperature-control device to the temperature-control circuit or to the temperature-control medium conducted in said temperature-control circuit may be realized for example by means of a chiller or a transfer heat exchanger. After the temperature control of the temperature-control medium, the latter is, at an interface 12, 12', transferred from the vehicle, or at the vehicle side, to the vehicle seat 1, 1'. For this purpose, the interface 12, 12' may be in the form of a coupling which transfers temperature-control medium and which, during installation and/or uninstallation of the vehicle seat 1, 1', allows non-destructive release and/or reconnection of the parts that conduct the temperature-control medium. Here, the coupling may be in the form of releasable connections between segments of transport lines of the temperature-control medium. The temperature-control medium is transported firstly to the third temperature-control heat exchanger 4''. An at least partial transfer of heat from the temperature-control medium to the gas stream 6, or vice versa, takes place there. The temperature-control medium is subsequently fed to the second temperature-control heat exchanger 4' arranged in the backrest 19. There, a transfer of heat takes place from the temperature-control medium to the backrest 10, or to a part of the vehicle seat 1. Finally, the temperature-control medium is fed to the first temperature-control heat exchanger 4, such that temperature control can take place between the temperature-control medium and the seat surface 9 or a person sitting on the seat surface 9. Subsequently, the temperature-control medium is fed back to the interface 12, 12' and ultimately back to the source temperature-control device 11 in order to allow a renewed exchange of thermal energy between the source temperature-control device 11 and the temperature-control medium. In FIG. 4, a further, fourth temperature-control heat exchanger 4''' is interconnected between the first temperature-control heat exchanger 4 and the interface 12.

The vehicle seat 1 has at least one control means 13, 13', 13'' which is controllable by means of the control device 7 and by means of which (a) a sequence of the transport of the temperature-control medium through or at at least two temperature-control heat exchangers 4, 4', 4'', 4''' arranged within a vehicle seat, and/or (b) a quantity and/or a volume flow of the temperature-control medium transported through or at at least one temperature-control heat exchanger 4, 4', 4'', 4''', is variable or controllable in open-loop and/or closed-loop fashion. On the basis of the exemplary embodiment in FIG. 2, it is for example possible, by corresponding control of the control means 13 and 13', for the temperature-control medium to be conducted past, or so as to bypass, the second temperature-control heat exchanger 4', such that the temperature-control medium, after having flowed through the third temperature-control heat exchanger 4'', is fed directly to the first temperature-control heat exchanger 4.

The vehicle seat 1 may optionally comprise at least one flow means 14 which is preferably controllable by means of a control device 7 and which is configured to at least temporarily vary flow characteristics of the temperature control medium at least in certain sections, and preferably, a flow resistance and/or a flow type and/or a volume flow and/or a flow speed within the temperature-control medium transported in the vehicle seat is variable at least in certain sections by the flow means 14. For example, the first temperature-control heat exchanger 4 may comprise a flow means 14 which is connected via a data connection 15''' to the control device 7.

It is possible for at least one temperature-control heat exchanger 4, 4', 4'', 4''' and/or at least one connecting line 16, 16', which is arranged or formed in or on the vehicle seat 1 and which transports the temperature-control medium, to be of variable-length, in particular elastic form at least in certain sections. For example, in FIG. 4, the seat surface 9 is divided into two parts, a first section 17 forms for example a thigh support and a second section 18 forms an actual seat surface 9 or a main seat surface of the vehicle seat 1, wherein the section 18 is displaceable or movable relative to the actual seat surface 9 or main seat surface, such that, for example, the spacing 19 is variable. By means of the variation of the spacing 19 of the thigh support relative to the main seat surface, it is possible to achieve an increase in comfort for a person sitting on the vehicle seat 1, because said person can adapt the seat surface 9 to their requirements or to their ergonomics. In or on the first section 17, there is arranged or formed a temperature-control heat exchanger 4''' which is operatively connected via a flexible connecting line 16' to the first temperature-control heat exchanger 4, such that a temperature-control medium can be transferred independently of the spacing 19. For example, for this purpose, the connecting line 16 is of flexible or elastic form.

The vehicle seat 1 may be equipped with at least one massage device (not illustrated) which is controllable in particular by means of a control device 7 and which is configured to, at least in certain sections, generate mechanical impulses and/or transmit these to a person sitting on the vehicle seat 1, and preferably, the massage device is in the form of a massage means (not illustrated) through and/or around which the temperature-control medium flows.

The vehicle seat 1 may optionally comprise at least one electrically operated or operable radiation heating means 20 which is configured to radiate or emit thermal radiation 21, and preferably, the radiation heating means 20 is arranged or formed in or on a backrest 10 and/or in or at a transition region of backrest 10 and seat surface 9 of the vehicle seat 1 such that the thermal radiation 21 radiated by it is directed in a direction pointing away from, in particular opposite to, a seating position or a viewing direction 22 of a person 34 sitting in a typical seating position on the vehicle seat 1 (illustrated by a schematic eye of the person 34). As per FIG. 3, two vehicle seats 1, 1' and a radiation heating means 20 arranged on at least one vehicle seat 1 may be oriented such that the thermal radiation 21 emitted by the radiation heating means 20 faces or is directed toward the seat region of the second vehicle seat 1'.

As can be seen from the embodiment as per FIG. 2, the vehicle seat 1 may have at least one valve means 23, which is in particular controllable by means of a control device 7 and by means of which the temperature-control circuit 3, in particular at least the temperature-control circuit in the vehicle seat, is at least temporarily openable to the surroundings and/or closable, and preferably, an air filter 24 is arranged between the valve means 23 and the surroundings. The valve means 23 is, by way of example, arranged in the connecting line between the second temperature-control heat exchanger 4' arranged in the backrest and the third temperature-control heat exchanger 4 arranged in the seat surface 9. The valve means 23 may for example be arranged in or on the backrest 10. The valve means 23 is preferably arranged at a higher level than the highest temperature-control heat exchanger 4, 4', 4", 4''' of the vehicle seat 1, in particular arranged higher than the highest temperature-control heat exchanger 4, 4', 4", 4''' located in the backrest 10.

Figure 3:
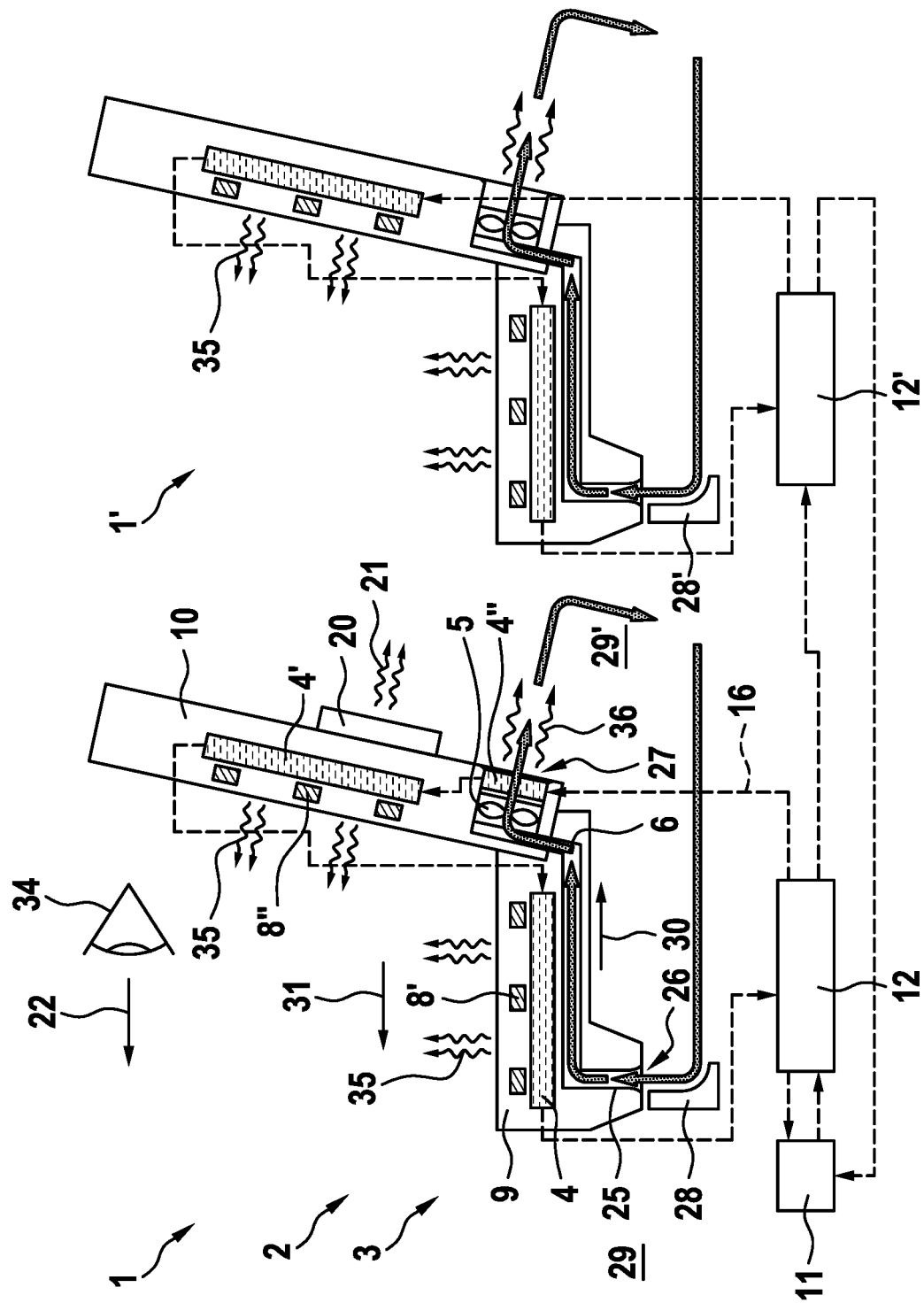
FIG. 3 is a diagrammatic illustration of a vehicle seat according to an embodiment of the present invention.

It is possible that the vehicle seat 1 comprises at least one flow channel 25 in which the gas stream 6 generated by the flow-generating device 5 can be transported at least in certain sections, and preferably, the gas stream 6 can be transported from an induction opening 26, in particular on the vehicle seat, via the flow channel 25, preferably without interruption, to an outlet opening 27, in particular on the vehicle seat, cf. FIG. 3. The induction opening 26 and/or the outlet opening 27 are arranged or formed on the vehicle seat 1. Here, the induction opening 26 is arranged or formed at the front (at a region of the vehicle seat 1 which is situated close to or next to the knee of a person 34 sitting on the vehicle seat 1) and below the seat surface 9 such that the air situated under a vehicle seat 1 is inducted. For this purpose, an air-guiding element 28, 28' on the vehicle and/or on the vehicle seat may be arranged or formed, which air-guiding element targetedly prevents or limits the induction of air from the foot region 29, 29' of the vehicle seat 1, 1' equipped with the flow-generating device 5 which generates the gas stream 6. In other words, air under the vehicle seat 1, but not the air situated in the foot region 29, 29', should be inducted for the gas stream 6 of the vehicle seat 1, 1' that defines the respective foot region 29, 29'. For example, as per FIG. 3, no air or scarcely any air is inducted from the first foot region 29 of the first vehicle seat 1 (that is to say from the first vehicle seat 1 that defines the foot region 29) in order to form the gas stream 6 generated by the flow-generating device 5 of the first vehicle seat 1. The air for forming the gas stream 6 generated by the flow device 5 of the first vehicle seat 1 originates at least partially, in particular predominantly, from the second foot region 29' of the second vehicle seat 1', arranged behind the first vehicle seat 1, or from the second foot region 29' defined by the second vehicle seat 1'.

The gas stream 6 flowing through the flow channel 25 is transportable at least in certain sections in a direction 30 which is not the same as the movement direction 31 of the temperature-control medium transported through or at a temperature-control heat exchanger 4, 4', 4". Optionally, the gas stream 6 is transported within the flow channel 25 in a direction 30 which is rotationally offset at least by 45°, in particular in an opposite direction, in relation to the movement direction 31 of the temperature-control medium transported in or at the temperature-control heat exchanger 4, 4', 4", 4'''. In particular, the direction 30 of the gas stream 6 and the movement direction 31 of the temperature-control medium in a temperature-control heat exchanger 4, 4', 4", 4''' are considered within a region in which the gas stream 6 and the temperature-control medium in the temperature-control heat exchanger 4, 4', 4", 4''' are thermally operatively connected, or within a region in which an exchange of thermal energy takes place between the temperature-control medium situated in the temperature-control heat exchanger 4, 4', 4", 4''' and the gas stream 6. In FIG. 3, an extent plane, in particular a main extent plane, of the temperature-control heat exchanger 4 arranged in the seat surface 9 and the extent plane, in particular main extent plane, of the flow channel 25 arranged in the seat surface 9 are oriented or configured to lie parallel, and in particular so as to point in opposite flow directions (direction 30, movement direction 31). It is thus for example possible for an exchange of thermal energy in accordance with the counterdirectional flow principle to be achieved. Alternatively, it is also possible for an orientation and/or configuration of the flow channel 25 and of the temperature-control heat exchanger 4 to be implemented in which the direction 30 of the gas stream 6 and the movement direction 31 of the temperature-control medium are codirectional, that is to say, for example, in accordance with a codirectional flow principle (not illustrated).

The vehicle seat 1 may comprise at least one, in particular movably mounted, air-guiding means 32, which directs a gas stream 6 transported downstream of the flow-generating device 5 in a direction pointing away from a seating position on the vehicle seat 1. The air-guiding means 32 may for example be in the form of a rotatably (cf. arrow 33) mounted flap and conduct or guide the gas stream 6 correspondingly in a manner dependent on its orientation or angular position. The at least one air-guiding means 32 can preferably be varied in terms of its orientation and/or positioning by means of the control device 7.

Optionally, the vehicle seat 1 may comprise at least one electrically operated or operable temperature-control element 8, 8', 8", wherein the temperature-control element 8, 8', 8" may be in the form of a heating element and/or cooling element. Preferably, the temperature-control element 8, 8', 8" is in the form of a Peltier element. The at least one electrically operated or operable temperature-control element 8, 8', 8" arranged on the vehicle seat may be configured such that a heating and/or cooling power of the at least one temperature-control element 8, 8', 8" is variable, at least temporarily in a manner dependent on a heating and/or cooling power of at least one temperature-control device 2 or at least temperature-control heat exchanger 4, 4', 4" 4''', in particular by means of the control device 7. The temperature-control elements 8, 8', 8" may preferably be arranged, below the surface of the seat surface 9 and/or of the backrest 10, close to a person 34 sitting on the vehicle seat 1.

The in particular major part of the temperature control of the vehicle seat 1 or of a person 34 sitting on the vehicle seat by the temperature-control heat exchanger 4, 4', 4''' and/or by the at least one electrically operated or operable temperature-control element 8', 8" is illustrated by the arrows 35. The temperature control of a region adjacent to the vehicle seat which has the temperature-control heat exchangers 4, 4', 4", 4''' and/or the heating elements 8, 8', 8" and/or the radiation heating means 20, and/or of an adjacent vehicle seat 1', which is in particular situated behind, by in particular substantially the at least one temperature-control heat exchanger 4", 4 (in part in as FIG. 3), the at least one temperature-control element 8' and/or the radiation heating means 20 is illustrated by the arrow 21 and/or by the arrow 36.

The control device 7 may optionally be connected or connectable to a mobile terminal 37 such that an exchange of data with regard to demand and/or state information items relating to the temperature-controlling means of the temperature-control circuit and in particular of the vehicle seat 1, 1' is made possible. The data exchange between control device 7 and mobile terminal 37 may take place for example via a data connection 15''''.

The control device 7 may be connected or connectable to control means 13, 13', 13'' and/or a flow means 14 via data connections 15, 15', 15'', 15''', 15''''. The data connections 15, 15', 15'', 15''', 15'''' may transmit data in wired or wireless fashion, and thus the data connections 15, 15', 15'', 15''', 15'''' may for example be in the form of a radio connection, preferably in the form of a short-range radio connection, in particular in the form of Bluetooth radio connection. Furthermore, the data connections 15, 15', 15'', 15''', 15'''' may be in the form of unidirectional or bidirectional data connections 15, 15', 15'', 15''', 15''''.

LIST OF REFERENCE DESIGNATIONS 1, 1' Vehicle seat
2 Temperature-control device
3 Temperature-control circuit
4, 4', 4'', 4''' Temperature-control heat exchanger
5 Flow-generating device
6 Gas stream
7 Control device
8, 8', 8'' Temperature-control element
9 Seat surface
10 Backrest
11 Source temperature-control device
12 Interface
13, 13', 13'' Control means
14 Flow means
15, 15', 15'', 15''', 15'''' Data connection
16, 16' Connecting line
17 First section of 9
18 Second section of 9
19 Spacing between 17 and 18
20 Radiation heating means
21 Thermal radiation
22 Viewing direction
23 Valve means
24 Air filter
25 Flow channel
26 Induction opening
27 Outlet opening
28, 28' Air-guiding element
29, 29' Foot region
30 Direction of 6
31 Movement direction
32 Air-guiding means
33 Arrow of 32
34 Person
35 Arrow
36 Arrow
37 Mobile terminal

What is claimed is:

1. A vehicle seat, comprising:
a temperature-control device having
a temperature-control circuit configured to transport a temperature-control medium,
at least one temperature-control heat exchanger connectable or connected to the temperature-control circuit, and
at least one flow-generating device configured to generate a gas stream,
wherein
the at least one temperature-control heat exchanger is configured to at least one of release to and absorb from the surroundings thermal energy using the temperature-control medium being transported in or at the temperature-control heat exchanger, and
temperature control of the gas stream is provided by at least one of the at least one temperature-control heat exchanger and by an electrically operated temperature-control element.

2. The vehicle seat according to claim 1, wherein
the at least one first temperature-control heat exchanger is arranged or formed in or on at least one of a seat surface and a backrest of the vehicle seat.

3. The vehicle seat according to claim 2, wherein
the vehicle seat includes at least one control device configured to be controlled by a controller to vary at least one of
a sequence of transport of the temperature-control medium through or at at least two temperature-control heat exchangers arranged within a vehicle seat, and
at least one of a quantity and a volume flow of the temperature-control medium transported through or at at least one temperature-control heat exchanger.

4. The vehicle seat according to claim 3, wherein
the vehicle seat includes at least one flow device configured to be controlled by the controller, to at least temporarily vary flow characteristics of the temperature-control medium at least in certain sections, and to vary at least one of a flow resistance, a flow type, a volume flow, and a flow speed of the temperature-control medium transported within the vehicle seat at least in certain sections.

5. The vehicle seat according to claim 4, wherein
at least one of the at least one temperature-control heat exchanger and at least one connecting line arranged or formed in or on the vehicle seat configured to transport the temperature-control medium, is of variable-length and is elastic at least in certain sections.

6. The vehicle seat according to claim 5, wherein
the vehicle seat includes at least one massage device configured to be controlled by the controller and to, at least in certain sections, at least one of generate and transmit mechanical impulses to a person sitting on the vehicle seat, and
the temperature-control medium flows at least one of through and around the at least one massage device.

7. The vehicle seat according to claim 6, wherein
the vehicle seat includes at least one electrically operated or operable radiation heating device configured to radiate thermal radiation, and
the radiation heating device is arranged in at least one of a backrest and in a transition region of backrest and seat surface of the vehicle seat, such that the thermal radiation radiated by the radiation heating device is directed in a direction pointing away from a seating position on the vehicle seat.

8. The vehicle seat according to claim 7, wherein
the vehicle seat includes at least one valve arrangement configured to be controlled by means the controller and to at least temporarily at least one of open and close the temperature-control circuit with respect to the surroundings, and
an air filter is arranged between the valve arrangement and the surroundings.

9. The vehicle seat according to claim 8, wherein
the vehicle seat includes at least one flow channel in which a gas stream generated by a flow-generating device is transportable at least in certain sections, and
the gas stream is transportable from an induction opening of the at least one flow channel on the vehicle seat to an outlet opening on the vehicle seat.

10. The vehicle seat according to claim 9, wherein
the gas stream is transportable at least in certain sections in a direction which is not the same as a movement direction of the temperature-control medium transported in or at the at least one temperature-control heat exchanger.

11. The vehicle seat according to claim 10, wherein
the gas stream is transportable within the at least one flow channel in a direction which is rotationally offset at least by 45° relative to the movement direction of the temperature-control medium transported in or at the at least one temperature-control heat exchanger.

12. The vehicle seat according to claim 10, wherein
the gas stream is transportable within the at least one flow channel in a direction which is opposite to the movement direction of the temperature-control medium transported in or at the at least one temperature-control heat exchanger.

13. The vehicle seat according claim 10, wherein
the vehicle seat includes at least one movably mounted air-guiding device configured to direct a gas stream downstream of the flow-generating device in a direction pointing away from a seating position on the vehicle seat.

14. The vehicle seat according to claim 13, wherein
the vehicle seat includes at least one electrically operated or operable temperature-control element the form of at least one of a heating element and an cooling element in the form of a Peltier element.

15. The vehicle seat according to claim 14, wherein
at least one of a heating and cooling power of the at least one temperature-control element is variable by the controller at least temporarily in a manner dependent on at least one of a heating and a cooling power of at least one of the at least one temperature-control heat exchanger.

16. A vehicle, comprising:
at least one vehicle seat with a temperature-control device having
a temperature-control circuit configured to transport a temperature-control medium,
at least one temperature-control heat exchanger connectable or connected to the temperature-control circuit, and
at least one flow-generating device configured to generate a gas stream,
wherein
the at least one temperature-control heat exchanger is configured to at least one of release to and absorb from the surroundings thermal energy using the temperature-control medium being transported in or at the temperature-control heat exchanger, and
temperature control of the gas stream is provided by at least one of the at least one temperature-control heat exchanger and by an electrically operated temperature-control element.

17. A method for temperature control of a vehicle seat having a temperature-control system which includes a temperature-control circuit configured to transport a temperature-control medium, at least one temperature-control heat exchanger connectable or connected to the temperature-control circuit, and at least one flow-generating device configured to generate a gas stream, the at least one temperature-control heat exchanger being configured to at least one of release to and absorb from the surroundings thermal energy using the temperature-control medium being transported in or at the temperature-control heat exchanger and temperature control of the gas stream being provided by at least one of the at least one temperature-control heat exchanger and by an electrically operated temperature-control element, comprising the acts of:
controlling an amount of thermal energy exchanged between the temperature-control circuit and at least of the seat and the surroundings.

* * * * *